United States Patent [19]

Schaefer et al.

[11] Patent Number: 5,366,190

[45] Date of Patent: Nov. 22, 1994

[54] REPEATER HOUSING MOUNTING UNIT

[76] Inventors: Charles C. Schaefer; Donald Christiansen; Charles G. Machledt, all of 1450 Rainville Rd., Tarpon Springs, Fla. 34689

[21] Appl. No.: 11,723

[22] Filed: Feb. 1, 1993

[51] Int. Cl.[5] .............................................. F16M 13/00
[52] U.S. Cl. .................................... 248/122; 248/156; 248/545; 52/28
[58] Field of Search ............... 248/122, 156, 542, 545, 248/530, 125; 174/58, 31, 51, 60, 63; 362/431; 52/103, 28, 220.1, 220.7, 220.2; 405/244

[56] References Cited

U.S. PATENT DOCUMENTS

| | | | |
|---|---|---|---|
| 3,240,459 | 3/1966 | Spohn, Jr. | 248/156 X |
| 3,338,002 | 8/1967 | Ericsson et al. | 52/28 |
| 3,375,620 | 4/1968 | Phillips | 52/28 |
| 3,502,785 | 3/1970 | Nickola | 248/156 X |
| 3,868,080 | 2/1975 | Olson | 248/156 X |
| 3,996,415 | 12/1976 | Provorse | 248/205.1 X |
| 4,076,198 | 2/1978 | Garrett | 248/156 X |
| 4,827,504 | 5/1989 | Collins et al. | 248/231 X |
| 4,833,566 | 5/1989 | Nickola | 248/156 X |
| 4,852,834 | 8/1989 | Hosman | 248/156 |
| 5,020,103 | 5/1991 | Holland | 248/125 X |

FOREIGN PATENT DOCUMENTS 2745394  4/1979  Germany ............... 248/125

*Primary Examiner*—Karen J. Chotkowski
*Attorney, Agent, or Firm*—Stanley M. Miller

[57] ABSTRACT

A four-sided hollow post provides a mount for four repeater housings of the type used by the cable industry and protectively houses the cable so that cable guards are not needed. The post has a removable back panel so that backfill material is positioned within the hollow interior of the post during the backfill procedure; this stabilizes the post so that it remains upright. The base of the post is also flared outwardly to accomplish the same objective. A unistrut bracket is positioned in each of the four side walls to enable facile mounting of brackets that support the repeater housings, and a knock out panel is formed in each side wall so that the cable stubs depending from a repeater housing may extend into the interior of the post through a cable exit port that is created when the knock out panel is removed.

9 Claims, 2 Drawing Sheets

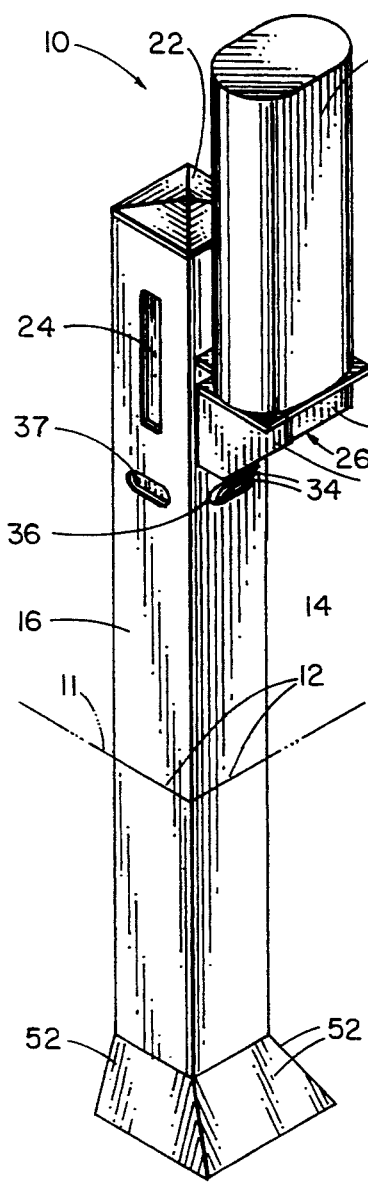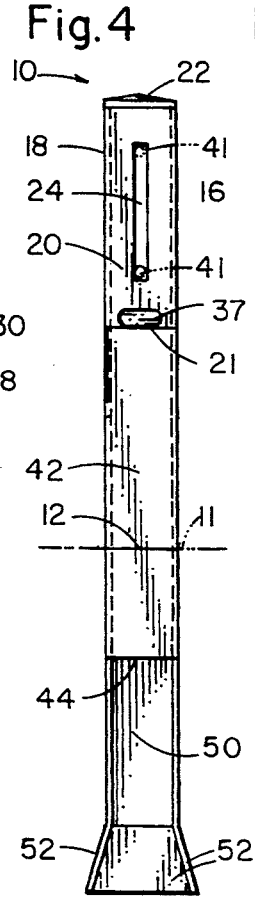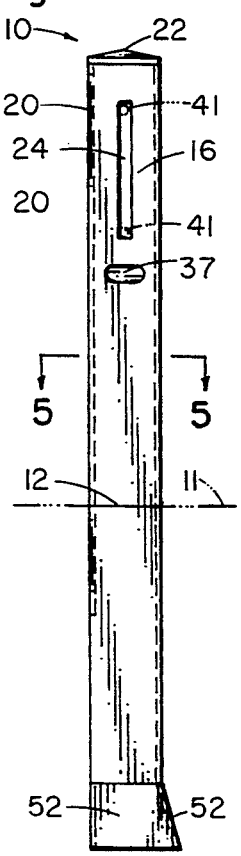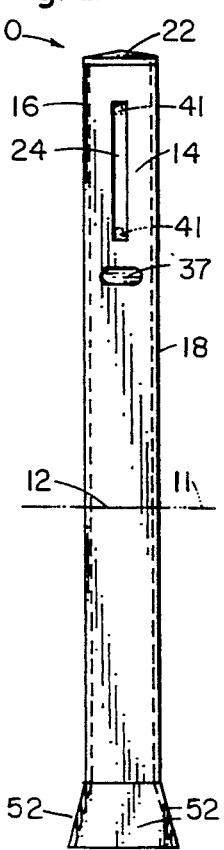

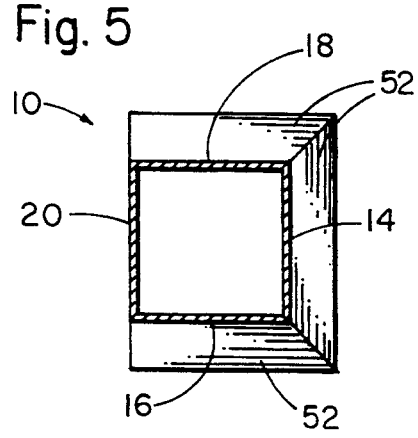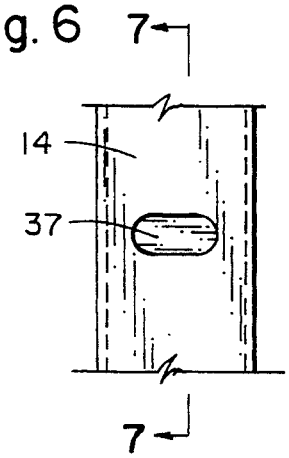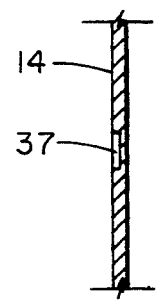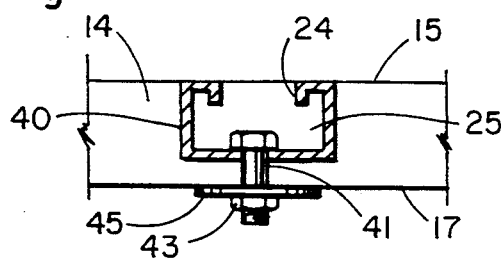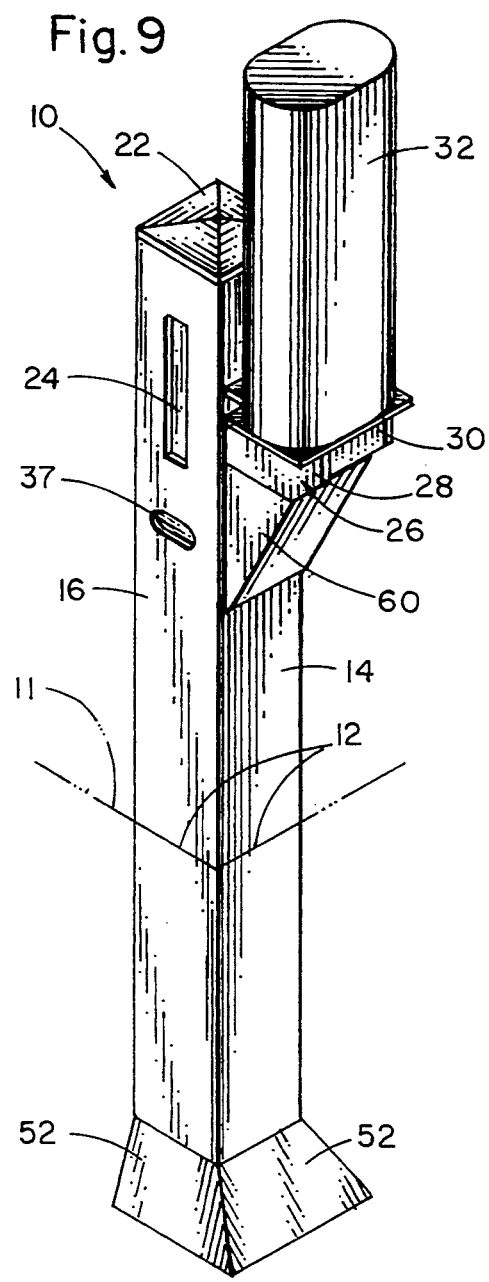

REPEATER HOUSING MOUNTING UNIT

BACKGROUND OF THE INVENTION

1. Field of the Invention

This invention relates, generally, to mechanical structures. More particularly, it relates to a mounting unit for a structure that houses a repeater.

2. Description of the Prior Art

Repeaters are installed at preselected intervals along the length of cable trunklines to boost the signal as needed. Typically, repeater housings are mounted to the uppermost end of a solid, upstanding post having a lower end implanted into the ground like a fence post. The posts are heavy and unsightly, and include no means for protecting the cable that extends from the trunkline to the repeater housing. Thus, external cable guards are required to provide the needed protection. Moreover, the posts now in common use support only one repeater housing per post.

To overcome the problems associated with the high weight of the solid posts, and to provide means for protecting the cable routed from the trunkline to the repeater housing, some inventors have taught that hollow pipes should be used as the mounting units for repeater housings. While that approach is sound, it has never been fully developed. Although hollow pipes are lighter than solid posts and protect the cable to a greater degree, they still provide no means for mounting a plurality of repeater housings on a single post. Introduction of cable into the hollow interior of the pipe is also problematic.

Those of ordinary skill in this art are of the opinion that future advances in this field will be of the evolutionary type, i.e., the only progress that will be achieved will be in the form of refinements of the existing solid posts and hollow pipes. How a significant breakthrough could be attained is not apparent.

SUMMARY OF THE INVENTION

The longstanding but heretofore unfulfilled need for a substantial innovation in the repeater housing mounting unit industry is now provided in the form of a hollow, four-sided structure that supports up to four repeater housings yet which weighs only about one hundred pounds. When properly installed, nearly half of its height is buried in the ground, thereby ensuring stability. Knock out panels are provided on each of the four sides of the novel mounting unit to provide cable exit ports when said panels are removed; thus, introduction of cable into the unit is not problematic. Each cable exit port is positioned just below the mounting bracket that holds a repeater housing, so that the length of cable that is exposed is reduced to a minimum.

Still further novel features include a removable closure plate for routing cable that is positioned on a preselected side of the unit, an opening to facilitate back filling when the lower end of the unit is implanted into the ground, said opening being provided on the side of the unit having said closure plate, and a ground line marked on the unit to facilitate such implanting.

Additional objects, advantages, and features of the invention will become apparent as this description proceeds.

The invention accordingly comprises the features of construction, combination of elements and arrangement of parts that will be exemplified in the construction hereinafter set forth, and the scope of the invention will be indicated in the claims.

BRIEF DESCRIPTION OF THE DRAWINGS

For a fuller understanding of the nature and objects of the invention, reference should be made to the following detailed description, taken in connection with the accompanying drawings, in which:

FIG. 1 is a perspective view of an illustrative embodiment of the invention when installed in the ground;

FIG. 2 is a front elevational view thereof;

FIG. 3 is a side elevational view thereof;

FIG. 4 is a rear elevational view thereof;

FIG. 5 is a sectional view taken along line 5—5 in FIG. 3;

FIG. 6 is a partial front elevational view of a side wall of the unit having a knock out panel;

FIG. 7 is a partial, side elevational view of the side wall of FIG. 6, depicting the thickness of the knock out panel;

FIG. 8 is a sectional view of a slot-defining member that receives a bracket upon which a repeater housing is mounted; and FIG. 9 is a perspective view of an embodiment having a cable guard.

Similar reference numerals refer to similar parts throughout the several views of the drawings.

DETAILED DESCRIPTION OF THE PREFERRED EMBODIMENT

Referring now to FIG. 1, it will there be seen that an exemplary embodiment of the invention is denoted as a whole by the reference numeral 10. The ground within which the lower end of the repeater housing mounting unit 10 is implanted is denoted 11; note ground line 12 which is marked by a permanent indicia means at the factory where unit 10 is manufactured.

Unit 10 has a four-sided construction as shown and includes flat side walls 14, 16, 18, and 20, as perhaps best shown in FIGS. 2-5. An imperforate, non-removable top plate 22 surmounts the four side walls and closes the hollow interior thereof; it is permanently affixed into position.

A bracket-holding means that may be provided in the form of an elongate, vertically aligned slot is associated with at least one of the sidewalls near the upper end thereof, in centered relation to the side edges of the side wall with which it is associated. Since all four of the slots in the preferred embodiment are the same, they are collectively denoted 24. Each slot 24 slidingly receives a bracket, generally denoted 26 in FIG. 1, having a pair of transversely spaced parallel arms 28, 30, and a repeater housing 32 is mounted atop said parallel arms as shown in said FIG. 1. Only one bracket 26 and repeater housing 32 is shown in FIG. 1 to simplify the drawing, but it is apparent from said Fig. that a single post provided with this novel design will accommodate four of said repeater housings 32.

A pair of cable stubs, collectively denoted 34, depend from the bottom of housing 32. Each pair of cable stubs extends into an associated cable exit port 36. As best understood in connection with FIGS. 6 and 7, when side walls 14, 16, 18, and 20 are made, each of them is provided with a thin, weakened section 37, known as a knock out panel, that can be knocked out at the time of unit installation to produce an exit port 36. Thus, if an application requires only three repeater housings, only three knock out panels 37 are removed. In the application of FIG. 1, for example, knock out panel 37 has not been removed; this prevents birds or insects from building nests within the unit 10.

A detailed view of the preferred bracket-holding means is provided in FIG. 8. There it will be seen that an elongate, flat-bottomed channel 25 is formed in the outer surface 15 of each side wall 14, 16, 18, or 20, and that a generally channel-shaped unistrut member 40 or other suitable bracket-engaging means is positioned within such channel and bolted by bolt 41 to its associated side wall; nut 43 and oversize washer 45 overlie interior surface 17 of each side wall as shown. Preferably, as shown in FIGS. 1-4, each unistrut member is bolted at its opposite ends to its associated side wall. A unistrut member will accommodate mounting brackets of many differing sizes and configurations, not just the bracket 26 shown in FIG. 1.

As shown in FIG. 4, rear side wall 20 is truncate in length; its lowermost edge is denoted 21. Thus, unlike side walls 14, 16, and 18, it does not extend from the top to the bottom of unit 10. Instead, it extends only from the top closure plate 22 to the lowermost edge of the knock out panel 37 formed in rear side wall 20, as is shown in said FIG. 4. A removable closure plate 42, secured by bolts, extends from the lowermost edge 21 of said knock out panel 37 to a point that is about six inches below the surface of the ground 11 when the novel unit 10 is properly installed. More particularly, the lowermost edge of said plate is denoted 44. Thus, the lower end of the unit, denoted 50, is open on the rear side thereof as shown in FIG. 4.

It should also be observed in FIGS. 3 and 5 that the lowermost end 50 of unit 10 is flared outwardly as at 52 on all sides except the rear side. This improves the stability of the unit, i.e., the outwardly flared base 52 serves to maintain the perpendicular relationship of unit 10 to the ground.

Cable guard 60 (FIG. 9) may be employed to cover the small extent of cable stubs 34 (FIG. 1) external to unit 10. This is useful because it is known to be less likely that the units will be vandalized when no cables can be seen.

Having disclosed the physical structure of unit 10, its installation and method of use will now be described. A site is selected that is level with or higher than the surrounding ground; the unit should not be placed in a drainage ditch or any other location where water is likely to accumulate. A hole, about eighteen inches in diameter, is dug at the selected site; its depth should be about three and one-half feet. The bottom of the hole is firmly compacted and pea gravel is charged thereinto; the depth of the pea gravel should be about six inches. Removable cover plate 42 is removed from unit 10 and said unit is placed in an upright position into the hole; the ground line 12 should be coplanar with ground surface 11 and conventional techniques for maintaining the uprightness of the unit should be followed. The hole is then backfilled with a suitable material in six inch increments, with each six inch layer being firmly compacted before the backfilling process continues. The interior of the unit is filled with the back fill material at the same time and in the same manner, because there is no rear side wall at the lower end of the unit as mentioned earlier. When the hole has been back filled to a point about six inches below ground line 12, removable closure plate 42 is attached to the unit by bolts or other suitable fastening means, and the backfilling is thereafter completed. This completes the installation of the unit by the individuals charged with such installation.

After the unit has been installed, it will be brought into service by personnel other than those who handled the initial installation. To bring the unit into service, the rear closure plate 42 is removed by digging the backfill material away therefrom to a depth of about six inches, i.e., a depth sufficient to expose the lowermost edge 44 of said closure plate, and by removing the bolts that secure said closure plate to the edges of side walls 16 and 18. The appropriate number of knock out panels 37 are then knocked out to provide the appropriate number of cable exit ports 36, and a mounting bracket 26 is installed in each unistrut member 40 associated with a cable exit port. The cable stubs 34 that depend from each repeater housing 32 are introduced into their associated cable exit port 36, and fed out of the open rear side of the housing 10, below lowermost edge 21 of rear side wall 20. The repeater housing 32 is then attached to its associated mounting bracket 26. The cable stubs are spliced to the cable from the trunkline, the rear closure panel 42 is reattached so that the spliced-together cables are within the interior of the hollow unit 10, and the excavated hole is re-filled to the ground line 12. Thus, the personnel who bring the unit 10 into service need only dig down about six inches at the back of the unit to facilitate removal of rear closure plate 42, and need only refill and retamp that small excavation to complete the job.

The resulting installation is aesthetically pleasing. Although the novel unit 10 may be made of any suitable material, the preferred material is glass fiber reinforced concrete. All parts are held together with standard-sized hardware and thus only standard tools are needed to install or maintain the unit. The need for cable guards is eliminated, and the unit has an unsurpassed stability due to its flared base and the fact that the lower end of the unit itself is back-filled at the time of installation. All of these features combine to provide a repeater housing mounting unit of heretofore unknown versatility.

This invention is clearly new and useful. Moreover, it was not obvious to those of ordinary skill in this art at the time it was made, in view of the prior art considered as a whole.

It will thus be seen that the objects set forth above, and those made apparent from the foregoing description, are efficiently attained and since certain changes may be made in the above construction without departing from the scope of the invention, it is intended that all matters contained in the foregoing description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Now that the invention has been described,
What is claimed is:

1. A repeater housing mounting unit, comprising:
   an elongate, hollow post having a plurality of sidewalls;
   a bracket-holding means associated with at least one of said sidewalls;
   a preselected sidewall of said plurality of sidewalls having predetermined length that is less than that of the other sidewalls;

said preselected sidewall and said other sidewalls each having an upper edge positioned at a top end of said post;

a closure plate having a predetermined length;

means for removably securing said closure plate to said unit so that an upper edge of said closure plate abuts a lower edge of said preselected sidewall;

said post being mounted in upstanding relation to a ground surface, said post having a lower end embedded in said ground surface;

said lower edge of said preselected sidewall being positioned above said ground surface and said lower edge of said closure plate being positioned below said ground surface.

2. The unit of claim 1, wherein said bracket-holding means includes a channel formed in an exterior surface of at least one of said sidewalls, and further includes a bracket-engaging means for releasably engaging a bracket that is positioned within said channel.

3. The unit of claim 2, wherein the bracket-engaging means is a unistrut member.

4. The unit of claim 1, further comprising means for enabling a cable to extend from a repeater housing mounted on a bracket that is mounted on said bracket-holding means into the hollow interior of said unit.

5. The unit of claim 4, wherein said means for enabling includes a cable exit port formed in at least one of said sidewalls.

6. The unit of claim 4, wherein said means for enabling includes a removable knock out panel formed in at least one of said sidewalls, so that when said knock out panel is removed from its associated sidewall, a cable exit port is formed so that said cable may extend therethrough.

7. The unit of claim 1, wherein all of said sidewalls except said preselected sidewall are flared outwardly at their respective lower ends to enhance the stability of the post when it is properly installed.

8. The unit of claim 1, further comprising a ground line indicia associated with at least one of said sidewalls.

9. The unit of claim 1, further comprising a cable guard for covering cable stubs that descend from a repeater mounted atop a bracket that is secured to said bracket-holding means.

* * * * *